Patented Oct. 16, 1934

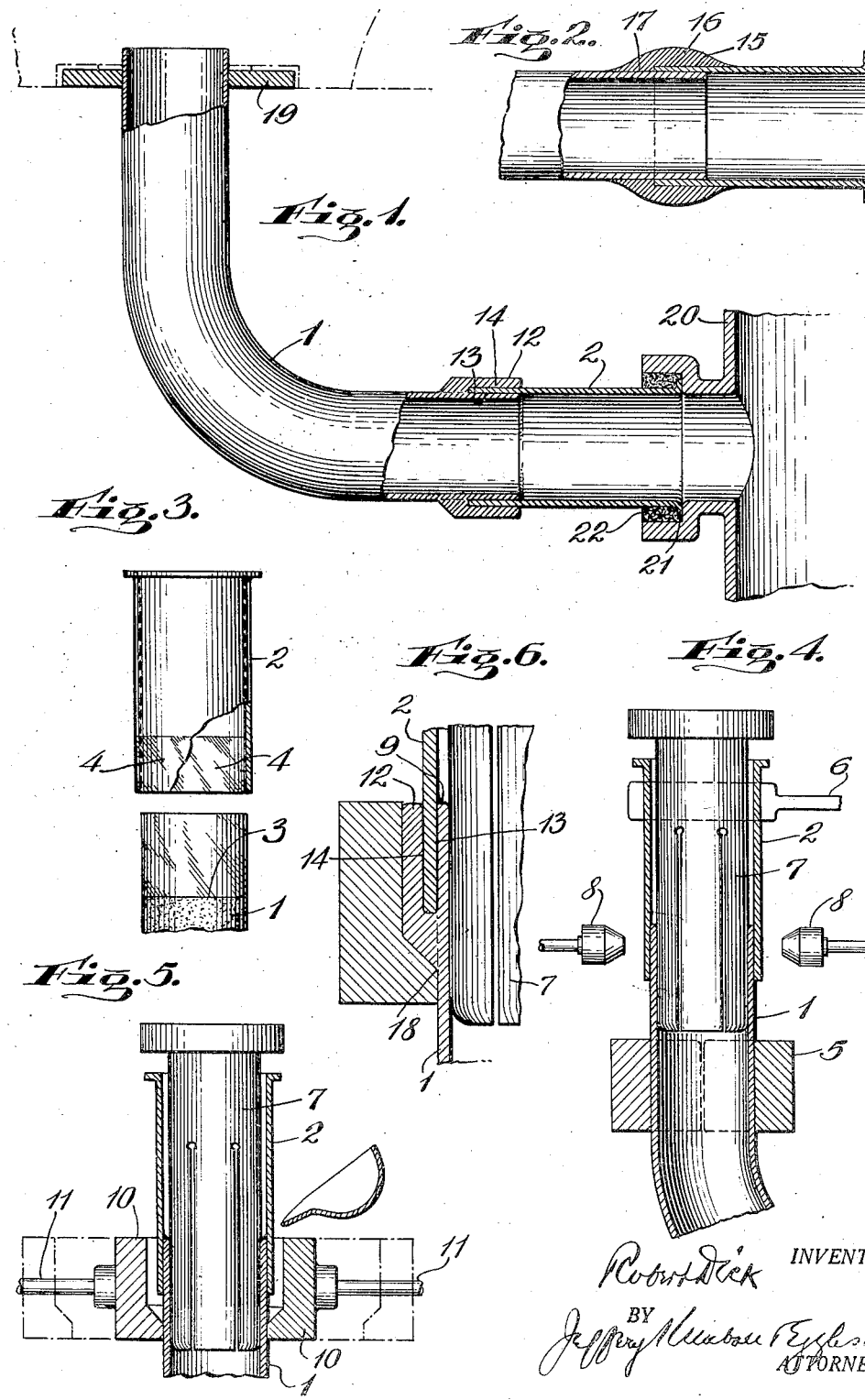

1,977,432

UNITED STATES PATENT OFFICE 1,977,432

LEAD BEND AND THE LIKE

Robert Dick, Bergenfield, N. J., assignor to National Lead Company, a corporation of New Jersey Application July 20, 1932, Serial No. 623,481

3 Claims. (Cl. 285—74)

The object of this invention is improvement of the connections used for connecting fixtures, such as sinks, toilet bowls and the like, to their soil pipe lines. In such systems, particular conditions are encountered incident to the relative movement between the fixture and the soil line, such movement occurring from the fact that the vertical soil pipe varies in length with changes of its temperature, whereas the various fixtures, being mounted on the floors of the building, are relatively stationary, though also subject in fact to some change of position due to beam shrinking and sagging floors. On account of this movement which is more or less continuous, it is customary to form the connections of such fixtures to their soil lines in part at least of a lead section or pipe, bent or curved, so as to be capable of flexing in accommodation to the change of position and termed in the trade as a lead bend or trap, according to the particular shape of the curvature. Such lead pipe sections are ordinarily connected directly to the fixture on the one hand and to the soil pipe on the other by means of a ferrule of brass or hard metal, one end of the ferrule being telescoped and tightly caulked into the bell opening of the soil pipe and its other end soldered to the lead pipe by means of a wiped joint. A wiped joint is made by molding or wiping a bulbous mass of solder about the junction of two pieces to be connected and such joints are the customary mode of attachment between the lead and the brass ferrule in these connections, being made by the plumber at the time of making the installation. Special skill and care are required in their making in order that the strains of the relative movement above referred to shall not weaken or break the bond so as to produce leakage and also in order that there shall be no interior edge or lip left projecting on the inside of the joint likely to catch and accumulate solid matter and result in clogging the flow through the connection. The construction of a wiped joint, which is secure and internally smooth and strong enough to carry safely the incident strains, requires not only experience, but also a certain knack which master plumbers find difficult to secure in their workmen with the result that the making of these connections constitutes a relatively expensive part of every plumbing job.

The object of this invention is to provide a simpler method of making the installation which will eliminate the difficulties referred to and enable the movement-accommodating connection to be made and installed at a lower cost and with a securer and better attachment and a smoother internal joint surface than can be readily produced by the wiped joint method now generally in use. This object is accomplished in part by producing the complete connection, viz. lead pipe section and brass ferrule, permanently joined together, as a unitary manufactured article, ready to be connected to the fixture at one end and caulked into the soil pipe at the other by the usual method of caulking, and also in part by the character of the joint between the lead and the brass, which joint is exceptionally secure and particularly suited to carry the continuous strain incident to the relative movement of the parts above referred to, besides being internally smoother and capable of production at a saving of some 20% of the cost of making such connections according to the old and hitherto customary method. The new article is thus a combined lead bend or trap and brass ferrule, having its two members united in a secure manner now about to be described in detail and with reference to its preferred form.

In the accompanying drawing, Fig. 1 illustrates the new article in elevation. Fig. 2 illustrates for comparison and old style wiped joint, such as heretofore used in these fixture connections between the lead and brass sections. The remaining figures represent successive stages in the manufacture of the new article, Fig. 3 representing the lead pipe and the brass ferrule in separated positions prior to their attachment. Fig. 4 represents the same parts telescoped and in process of being joined. Fig. 5 represents a further stage and Fig. 6, a section of the finished joint in larger scale.

The lead bend is commonly formed in an extrusion press, although it can be made otherwise. After being cut or trimmed to a determined dimension, the end which is to be attached to the ferrule 2 is either tinned for a certain distance from its end, or scraped bright or freed of oxide, as indicated above line 3 in Fig. 3, and if desired, the portion of it below the line 3, can be painted with so-called plumber's soil, to keep any excess metal from sticking to it and thus produce a neater finish for the completed joint. The brass ferrule 2 is tinned on its inside and preferably on its outside also, as indicated at 4 and as may be done by dipping the end of the ferrule in a molten solder bath, to the necessary depth. Thereupon the end of the lead pipe 1 is telescoped into the tinned end of the brass ferrule as indicated by Fig. 4, the lead pipe being appropriately held in a suitable clamp, diagrammatically indicated by 5 in that figure, and the ferrule being held by any suitable holding fixture diagrammatically shown by 6.

With the two parts held in this position, an expander plug 7 is pushed into the end of the pipe within the ferrule, so as to press or expand the lead wall outwardly and smoothly against the interior tinned surface of the latter. This expander plug may be a simple slightly tapered plug, but preferably has some resilience so that after it has expanded the lead wall into firm contact with the ferrule, it will continue to exert outward pressure upon such wall. For this purpose it may conveniently be a hollow steel cylinder or plug, slitted, as indicated in Fig. 4, to give it the resilience referred to, being also tapered at its end so as to enter the lead pipe easily, expanding it, and smoothing it but otherwise without deforming it. The act of introducing the plug will tend to bevel somewhat the inner edge of the lead pipe which is a minor advantage of the process.

It will be understood that the tinning is merely a coating of solder metal, usually an alloy of 50% tin and 50% lead, which has a melting point considerably lower than that of the lead pipe 1 and of course much lower than the melting point of the brass ferrule 2.

With the parts held in the relation of Fig. 4, and the lead and brass pressed into contact, a flame or equivalent heating agency is applied to the exterior tinned surface of the ferrule long enough to raise its temperature above the fusion point of the solder coating or tinning, but not above that of the lead pipe. Thereby the tinning between the lead pipe and the ferrule is fused and the pressure still exerted by the resilient expander 7 presses the lead still further outwardly into a close and circumferentially uniform bearing contact upon the ferrule wall. This pressure is sufficient to squeeze out from between the two overlapped surfaces any excess of the fused tinning solder, so that an extremely close bond is thus formed when the tinning cools, but the excess squeezed out is slight and not sufficient in amount to result in any interior projection inside the joint; it may become manifested as a small bank or fillet of solder occupying the corner between the end of the lead pipe and the wall of the ferrule, as indicated at 9 in Fig. 6.

While the temperature of the parts is still above or close to the fusion point of the tinning solder, and while the expander remains in place, a two-part mold 10 is brought into position, clamping the lead pipe around and below its junction with the brass. The two parts of this mold are indicated in Fig. 5 as supported by holder rods 11, which will be understood to be merely diagrammatic representations of parts of the machine in which the process is carried out; such two-part mold can be supported and operated in any suitable way, by hand if desired. As thus adjusted and as indicated in Fig. 5, molten lead, the same as the metal of the pipe 1, is poured from a ladle, as indicated, into the adjusted mold to form a ring 12 of lead over and covering a short section of the lead pipe and all of the tinned end of the ferrule, which is thus imbedded in lead. The molten lead amalgamates with the tinned surface of the ferrule and the exposed surface of the lead pipe, forming with the latter a bond which is substantially homogeneous and ordinarily without a discoverable line of demarcation to show the junction so that the attachment resulting when the poured lead has set is quite the same as if it had been wholly made by casting.

As thus made, the joint (see Fig. 6) comprises a double bond between the ferrule and the lead, that is to say, one bond is indicated by 13 in Fig. 6, and the other is on the opposite side, indicated by 14, the bond in both cases being with opposite sides of the same part, that is, of the ferrule. By comparison with the old wiped joint attachment shown in Fig. 2, it will be apparent that it has far greater security. In the latter, there is ordinarily no bond whatever between the proximate faces of the lead and the brass, but on the contrary a more or less open crevice commonly exists at this point likely to collect and retain corrosive liquids which may ultimately destroy the brass. The strength of this old joint is merely that represented by the single bond 15 between the ferrule and the wiping solder 16, or, the single bond between such solder and the surface 17 of the lead pipe. While either or both of these might be a secure bond, it is obvious failure of either would produce leakage and that the strength is not comparable to that secured in the new article wherein the ferrule is double-bonded to the lead and wherein the end of the ferrule is covered and protected by a ring of cast metal and not solder.

It will be understood that in the adjusting of the sectional mold 10 to the pipe, as indicated in Fig. 5, the lower part of the mold cavity is brought into substantial registry with the line 3, which marks the limit of the part of the lead pipe, which is to form the bond. In this way, an even corner, neat in appearance, is produced, as indicated at 18 in Fig. 6. The top surface of the poured ring 12 after cooling is substantially flush with the end of the lead pipe 1 inside of the ferrule and may easily be dressed off with a suitable scraper or otherwise to perfect its appearance.

On the completion of the double-bond joint, the new article of this invention has been produced and is ready to be installed to form the whole connection between the base plate of a plumbing fixture indicated diagrammatically at 19 in Fig. 1 in the usual way, and the soil pipe line indicated at 20. For the former purpose the end of the lead pipe is unflanged so that it may be inserted into the plate opening to be then hammered down over it and soldered to it as indicated. For attaching the ferruled end to the soil pipe the flange 21 on the free end of the ferrule is introduced into the bell opening of the soil pipe and then caulked (22) therein, as indicated and according to the usual custom. The article thus consists as produced and ready for sale of an unflanged lead section and a flanged brass section permanently bonded together. The natural flexibility of the lead permits adjustment of the article to both parts initially and thereafter accommodates the relative movement therebetween without danger of leakage, as will be understood, the plumber having no wiped joint to make on the job nor requiring any particular skill or knack to make the installation as a whole.

The following is claimed:

1. A ready-made waste connection comprising a lead pipe part and a hard metal ferrule part permanently joined to each other and together constituting a unitary article of manufacture to form the whole waste connection between a plumbing fixture and an iron soil line, the lead pipe element of the article being joined by a layer of solder to the inner surface of the ferrule element and having a substantially integral lead ring portion overlapping the outer surface of said ferrule element and joined thereto by a layer of solder, thus interposing two solder bonds to the leakage of fluid from said article.

2. A ready-made plumbing connection comprising a lead pipe part and a hard metal ferrule part permanently joined together and constituting a unitary article of manufacture to form the whole waste connection between a plumbing fixture and an iron soil line, the ferrule being telescoped over and soldered to the outer surface of the lead part and said lead part having a ring of lead (as distinguished from solder) cast thereon so as to be integral therewith and said ring being united by a solder bond to the outside surface of said ferrule part, thereby interposing two soldered bonds successively in any possible leak path between said parts.

3. The article of claim 1 further characterized by an annular solder fillet between the end of the lead pipe part and the inner surface of the ferrule part.

ROBERT DICK.